Aug. 2, 1960    H. D. WILSON    2,947,373
BATTERY MOUNTING APPARATUS
Filed Aug. 11, 1958    3 Sheets-Sheet 1
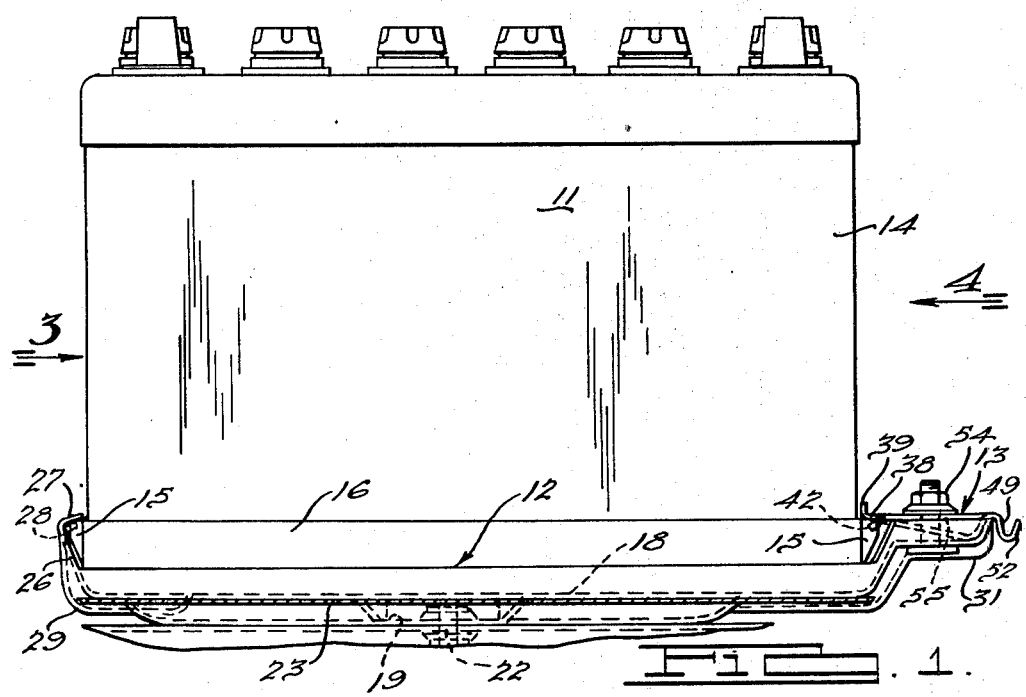
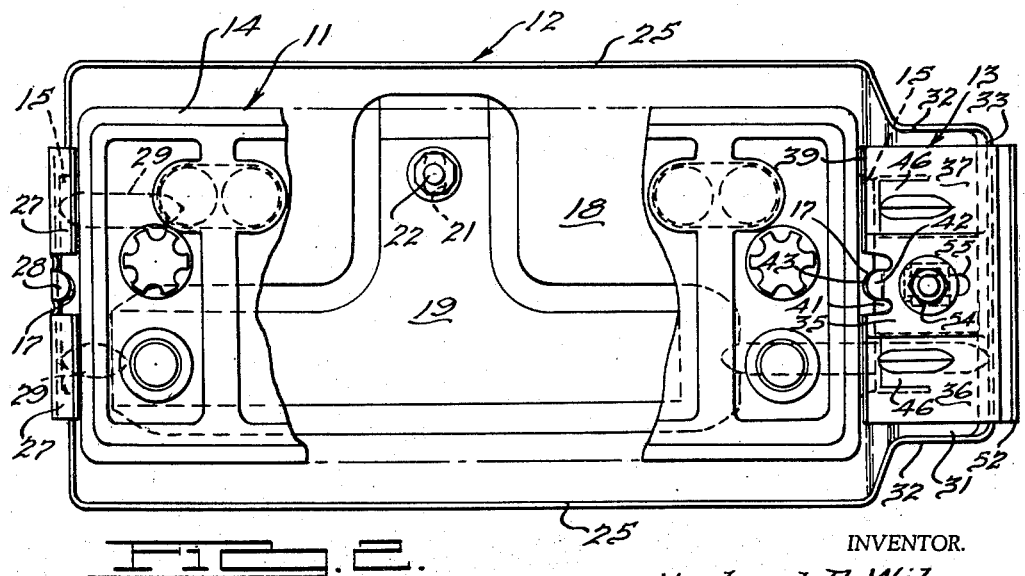
INVENTOR.
Harland D. Wilson.
BY E. C. McRae
J. H. Oster
J. J. Roethel
ATTORNEYS.

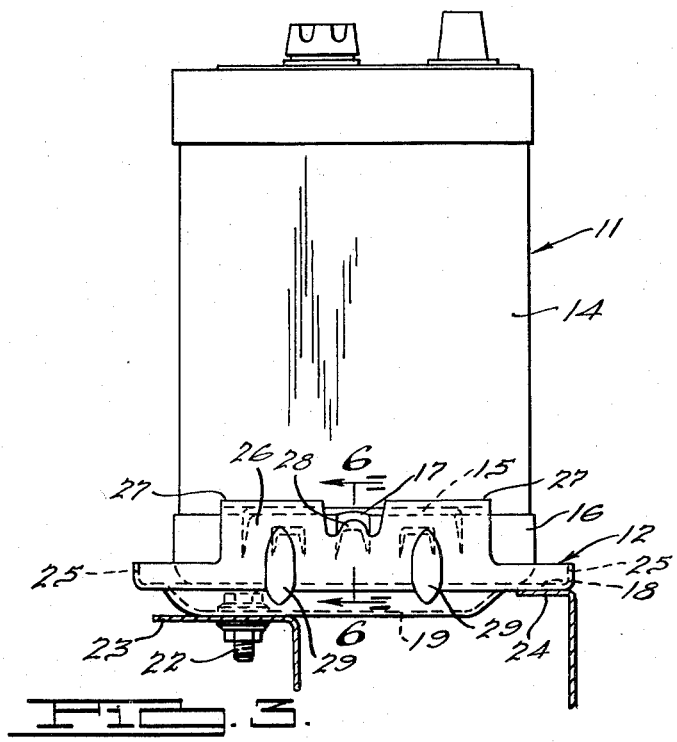
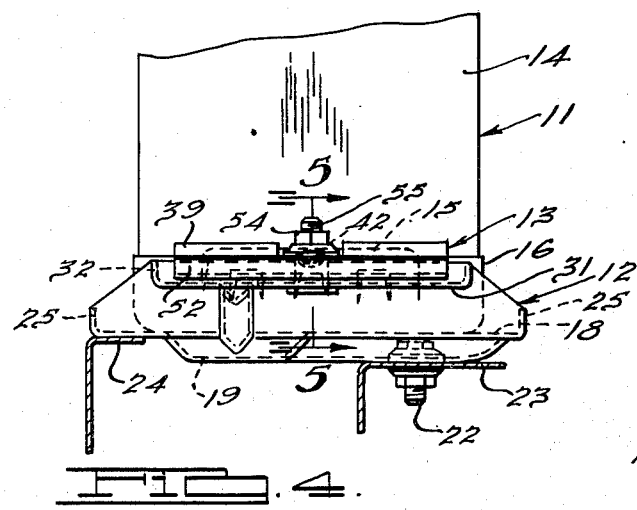

Aug. 2, 1960 H. D. WILSON 2,947,373
BATTERY MOUNTING APPARATUS
Filed Aug. 11, 1958 3 Sheets-Sheet 3
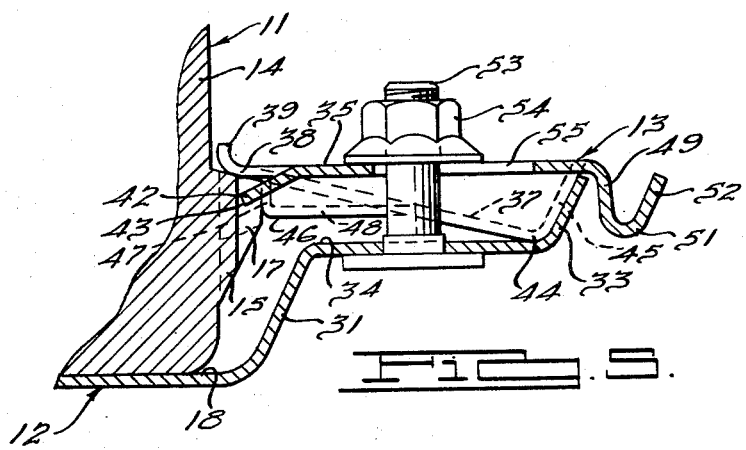
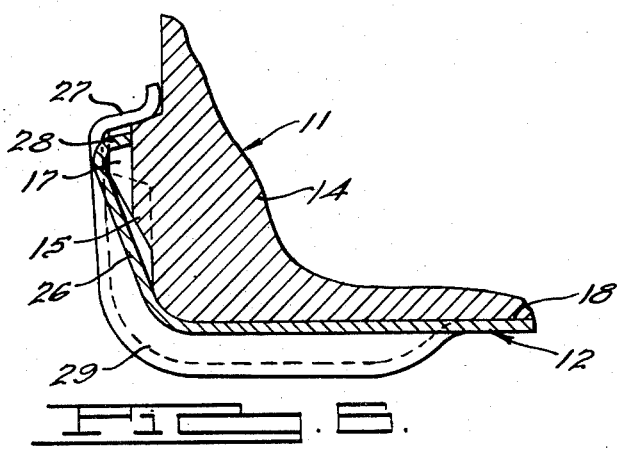
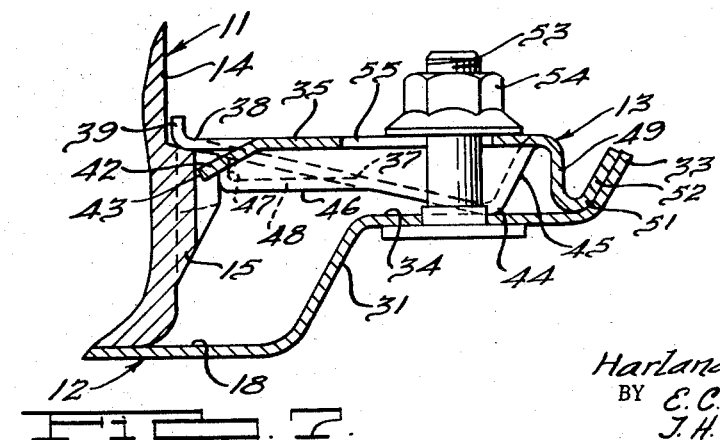
INVENTOR.
Harland D. Wilson.
BY E.C. McRae
J.H. Oster
J.J. Roethel
ATTORNEYS

2,947,373

BATTERY MOUNTING APPARATUS

Harland D. Wilson, Lathrup Village, Mich., assignor to Ford Motor Company, Dearborn, Mich., a corporation of Delaware Filed Aug. 11, 1958, Ser. No. 754,297

2 Claims. (Cl. 180—68.5)

The present invention relates to an improved vehicular battery supporting and retaining structure and more particularly to a battery support tray structure having a battery bottom hold-down means appended thereto.

In most current conventional vehicular battery installations, the battery is supported in the vehicle engine compartment on a battery carrier or tray mounted on a bracket secured to the front fender apron. A battery hold-down clamp is provided which comprises a flanged rectangular metal ring adapted to fit around the upper peripheral edge of the battery case. Hold-down pressure is applied through elongated clamp bolts extending between suitable apertures in the battery carrier and bolt loops in the hold-down clamp, suitable wing nuts or the like being provided to apply the clamping pressure.

There are several disadvantages to the foregoing conventional installation practice. The most annoying is the accumulation of corrosive deposits on the clamp and bolt threads. The clamps and threaded portions of the bolts lie adjacent the tops of the batteries and are subject to the acid creepage and corrosive vapors emanating from the battery. Acid on the battery top permits electrical leakage to the grounded metal clamps and bolts, promoting electrolytic corrosion and battery discharge. Excessive tightening of the hold-down bolts may distort the thin-wall containers, displacing the sealing compound and causing acid leakage which is destructive to other electrical components.

The hold-down clamp is generally a non-extensible member and will fit only one size battery case. Thus, when an emergency change of batteries is dictated and a battery having the proper size case is not available, the hold-down clamp cannot be used and the battery must be permitted to bounce around on the battery carrier until a proper replacement can be obtained.

Further, the use of a hold-down clamp engaging the upper part of the battery case is poor practice. The upper part of the battery case is structurally weak since it comprises a sealed-over opening, whereas the bottom of the battery case is usually an integrally molded unit.

Accordingly, it is an object of the present invention to provide an improved vehicular battery supporting and retaining structure comprising, in combination, an improved support tray, an improved battery bottom hold-down means appended thereto, and an improved battery casing having means located near the structurally strong bottom cooperating with the tray and bottom hold-down means.

Other objects, advantages and features of the present invention will be made more apparent as this description proceeds, particularly when considered in connection with the accompanying drawings, wherein:

Fig. 1 is a side elevational view of the battery, battery tray and bottom hold-down clamp embodying the present invention;

Fig. 2 is a plan view of Fig. 1;

Fig. 3 is an end elevational view taken in the direction of the arrow 3 of Fig. 1;

Fig. 4 is an end elevational view taken in the direction of the arrow 4 of Fig. 1;

Fig. 5 is a sectional view taken substantially through line 5—5 of Fig. 4 looking in the direction of the arrows;

Fig. 6 is a sectional view taken substantially through line 6—6 of Fig. 3 looking in the direction of the arrows; and Fig. 7 is a view in part similar to Fig. 5 illustrating the parts in a second operative position.

Referring now to the drawings and more particularly to Figs. 1 to 4, inclusive, there is illustrated a vehicular storage battery, generally designated 11, a support tray, generally designated 12, and a selectively positionable bottom hold-down clamp, generally designated 13.

The battery 11 comprises a conventional rectangularly shaped case 14 except that it is provided at each end thereof with an outwardly projecting and horizontally extending rib 15. Each rib 15 is integral with and projects only slightly above the level of the lower band 16 of the battery case 14. Each rib 15 is somewhat shorter in length than its related end of the battery case, as perhaps best seen in Fig. 3. On the longitudinal centerline of the case 14, each rib is provided with a vertically extending semi-cylindrical notch or recess 17 having a dual purpose, as will be explained.

The support tray 12, which is preferably a sheet metal stamping, is substantially rectangular in shape. The tray bottom 18 is provided with a T-shaped depression 19 which functions as a reinforcing rib and also provides a depressed surface provided with a bolt receiving slot 21 adapted to receive a bolt 22 for securing the tray to a suitable shelf or bracket 23 attached to the front fender apron (not shown) within the vehicle engine compartment. The tray 12 may also have secured to its underside by welding or the like a flange 24 of a bracket (not shown) also adapted to be secured to the front fender apron or radiator support structure within the engine compartment. The mounting of the tray 12 within the engine compartment forms no part of the present invention and the foregoing brief reference thereto is believed sufficient for an understanding of the function of the structure herein being described.

The side flanges 25 of the tray are relatively low. However, at each end the support tray 12 is provided with structure adapted to cooperate with the ribs 15 on the battery case 14 to retain the battery in the tray.

Referring first to the left end of Figs. 1 and 2, particularly as illustrated in Figs. 3 and 6, it will be noted that the support tray 12 is provided with an upwardly extending and outwardly angularly inclined center end wall section 26. The end wall section 26 terminates in two spaced inwardly turned lip portions or flanges 27 adapted to overlie the rib 15 on the adjacent end of the battery case 14 when the latter is positioned in the tray 12. Intermediate the two inwardly turned lip portions 27 the end wall section 26 is provided with an inwardly turned semi-cylindrical lip 28. The lip 28 is slightly below the level of the lip sections 26 and is adapted to enter into the notch or recess 17 in the battery case flange 15. The lip 28 is effective to provide a battery case centering guide and to retain the end of the battery against lateral displacement relative to the tray 12. Suitable reinforcing ribs 29 may be embossed in the bottom and end wall of the tray 12 to provide rigidity to the end wall section 26.

The opposite end or right end of the support tray 12, as viewed in Figs. 1 and 2, is provided with a more elaborate battery case hold-down means, as more particularly seen in Figs. 4 and 5. The support tray 12 at this end is provided with an extension 31 encompassed on three sides by a flange 32 which along the end section 33 thereof is outwardly angularly inclined. The plane of the bottom plate portion 34 of the extension 31 is somewhat elevated and parallel to the plane of the tray bottom 18. The extension 31 provides a platform for the hold-down clamp 13.

The hold-down clamp 13, which is preferably stamped from sheet metal, comprises a substantially rectangular member as viewed from the top. It is divided into a substantially flat center section 35 and two angularly depressed side sections 36 and 37. The front edge 38, the left edge as viewed in the drawings, is provided with an upturned lip 39. Along the longitudinal centerline of the flat center section 35, the front edge is cut back to form a recess 41 provided with a tab 42 having a rounded leading edge 43. As best seen in Fig. 5, the tab 42 is angularly inclined below the plane of the flat center section 35. The tab 42 is adapted to enter into the recess or notch 17 in the rib 15 on the battery case 14 to act as a centering means.

The downward inclination of the side sections 36 and 37 is from the front edge 38 toward the rear of the hold-down clamp 13. Each side section terminates in a rounded corner 44 and an upwardly inclined end wall 45. Each side section 36 and 37 is provided near the front edge thereof with a substantially square depression 46 having a vertical front wall 47 and a flat bottom 48 paralleling the plane of the flat center section 35 of the clamp 13. The vertical front walls of the two depressions 46 are in alignment and are adapted to abut the vertical face of the battery case rib 15, thereby properly positioning the front edge 38 of the clamp device over the rib 15.

The rear edge of the clamp member 13 is provided with a downwardly extending vertical flange 49. The vertical flange 49 terminates in a rounded corner 51 and an upwardly extending lip or flange 52, the latter being parallel to the angularly inclined depressed portion end walls 45. The angle of inclination of the end walls 45 and the flange 51 is substantially the same as that of tray extension end flange 33, for a reason to become apparent.

The clamp 13 is held in clamping position by a bolt 53 projecting upwardly from beneath the tray extension 31. The bolt may be provided with a square shank and the aperture in the extension bottom 34 may be a square hole to accommodate the square shank thereby providing a means for holding the bolt against turning movement as the nut 54 is tightened. The flat center section 35 of the clamp 13 is provided with an elongated slot 55, for a reason to become apparent.

The ease with which a battery may be installed in the support tray embodying the present invention is believed readily apparent. The battery is simply set down in the tray in an approximately centered position and then pushed longitudinally in the direction of the tray end wall 26. The lip 28 on the tray end wall engages the center notch 17 in the end rib 15 at the left end of the battery as viewed in the drawings. The battery is held down at this end by the retaining lips 27 which are sufficiently resilient to receive the upper surface of the rib 15 therebeneath and to exert a strong hold-down pressure thereon.

The clamp 13 is then positioned and the nut 54 tightened down. As seen in Figs. 5 and 7, the clamp may be positioned with the end wall 45 abutting the end wall 33 of the tray extension 31 when a long battery is positioned in the tray or with the upwardly extending flange 52 abutting the end wall 33 of the tray extension 31 when a shorter length battery is supported in the tray.

The notches 17 in each rib 15 permit the battery to be used with a conventional battery hold-down clamp device, if desired, since the notches provide clearance for the elongated hold-down bolts used with such a device. Thus, the battery is interchangeable with those in use on older model vehicles, although the old style battery cannot be used with the improved structure embodying the present invention.

It will be understood that the invention is not to be limited to the exact construction shown and described, but that various changes and modifications may be made without departing from the spirit and scope of the invention, as defined in the appended claims.

What is claimed is:

1. A battery hold-down device comprising, in combination, a battery case having integral laterally extending ribs at each end thereof, said ribs being located adjacent and parallel to the bottom of said battery case, a support tray having at one end thereof an end wall provided with overhanging flange means beneath which the rib at one end of said battery case projects to hold down said one end of the battery case, a selectively positionable clamp member to hold down the other end of said battery case, said clamp member being fulcrumed on the other end of said support tray on a raised extension thereof and being provided with a clamping portion, abutment means on said clamping member coacting with an end wall of said raised extension and defining the extent of said clamping portion, and pressure means acting through said raised extension on said clamp device causing the clamping portion thereon to apply hold-down pressure on the rib at said other end of the battery case.

2. A battery hold-down device comprising, in combination, a battery case having integral laterally extending ribs at each end thereof, said ribs being located adjacent and parallel to the bottom of said battery case, a support tray having at one end thereof an end wall provided with overhanging flange sections beneath which the rib at one end of said battery case is inserted to hold down the latter, said support tray having a raised extension on the other end thereof, a selectively positionable clamp member fulcrumed on said raised extension to hold down the other end of said battery case, said clamp member being provided with a clamping portion, abutment means on said clamping member coacting with an end wall of said raised extension and defining the extent of said clamping portion, and pressure means on said clamp device causing the clamping portion thereon to apply hold-down pressure on the rib at said other end of the battery case, said one end wall and said clamp member being provided with centering means each engaged with a cooperating means on said ribs to maintain said battery case against lateral movement in said support tray.

References Cited in the file of this patent

UNITED STATES PATENTS

| | | |
|---|---|---|
| 1,091,583 | MacGlashan | Mar. 31, 1914 |
| 1,252,706 | Ledig | Jan. 8, 1918 |
| 1,770,066 | Christophel | July 8, 1930 |
| 2,461,002 | Riggs | Feb. 8, 1949 |
| 2,817,409 | Cullmann | Dec. 24, 1957 |

FOREIGN PATENTS

| | | |
|---|---|---|
| 7,034 | Great Britain | May 11, 1915 |